(No Model.) 2 Sheets—Sheet 2.
P. F. H. SOBOLEWSKI.
DRY GAS METER WITH ROTATING DRUM.
No. 511,368. Patented Dec. 26, 1893.
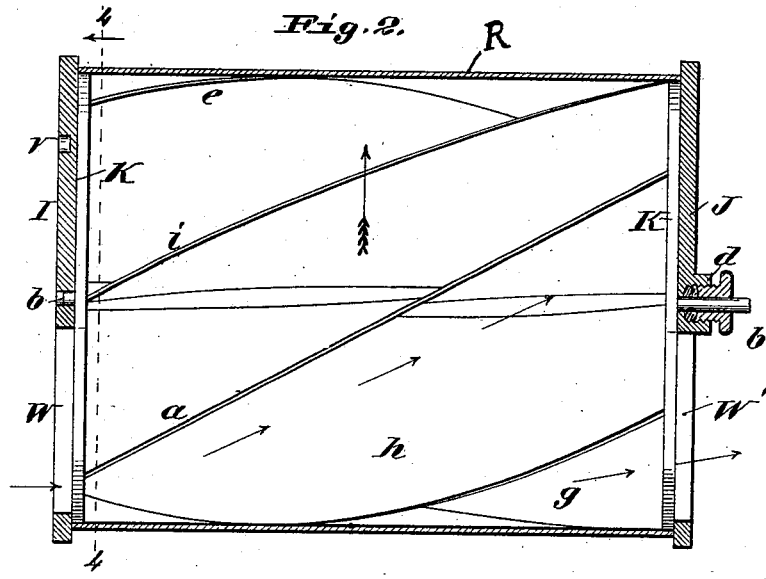
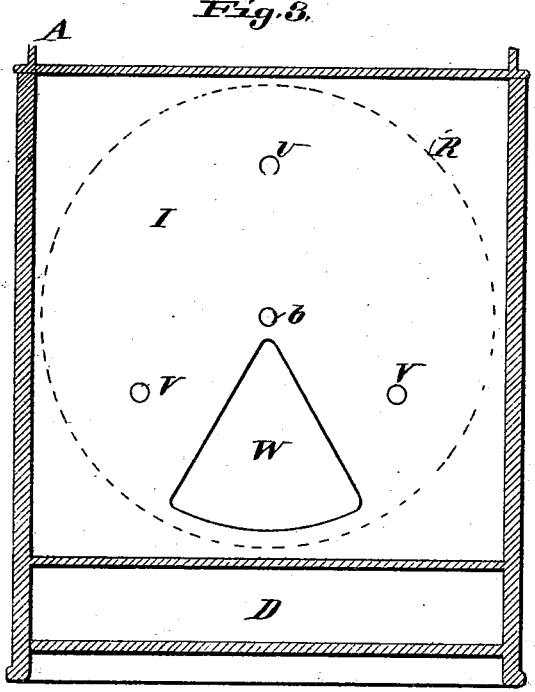
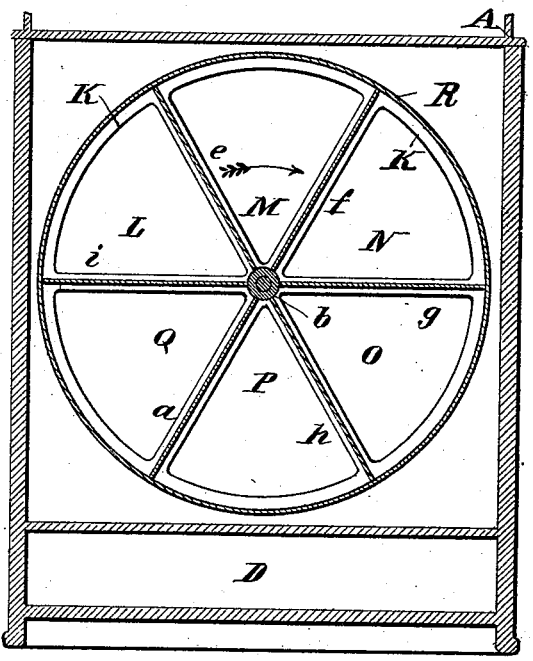
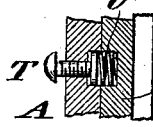
Witnesses:
Charles Pickles
Walter D. Coles
Inventor:
Paul F. H. Sobolewski
By Fisher & Fisher
Attorneys.

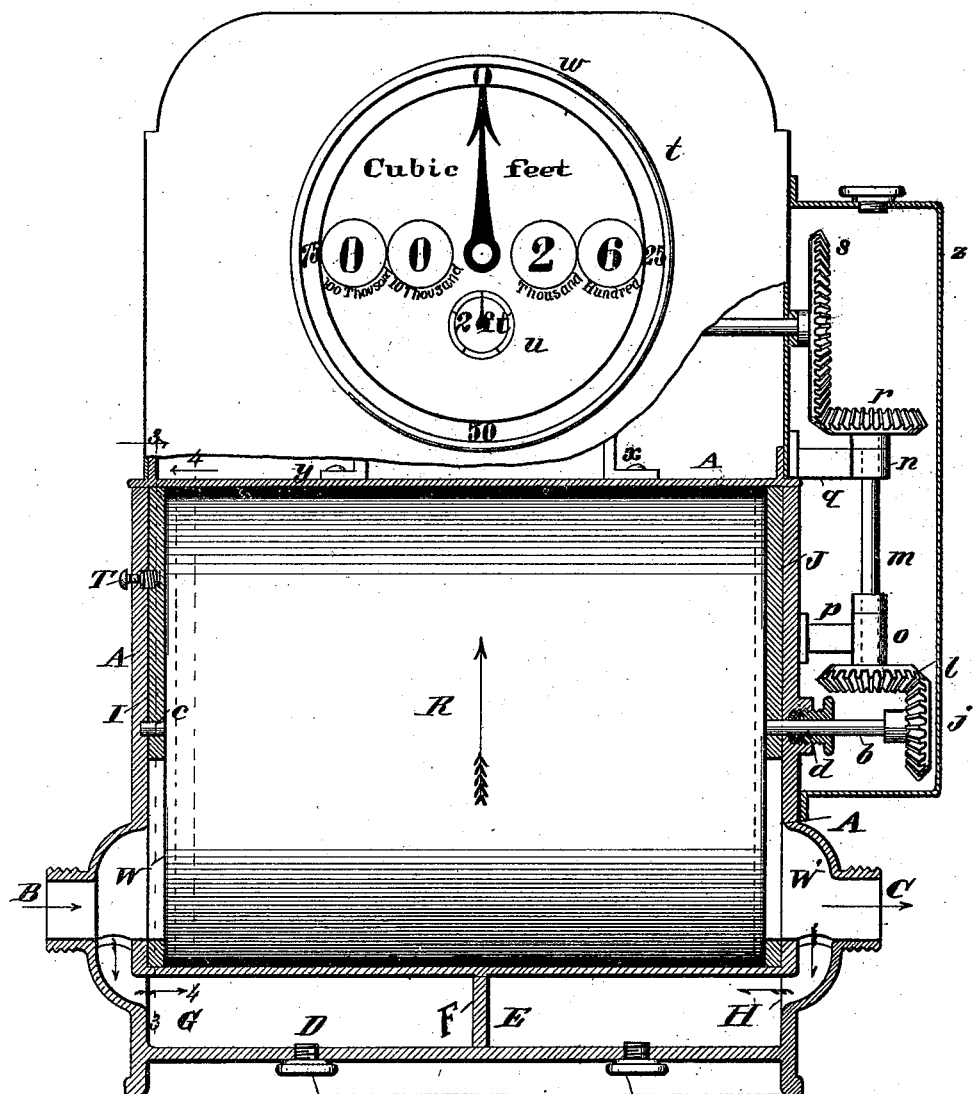

UNITED STATES PATENT OFFICE.

PAUL F. H. SOBOLEWSKI, OF ST. LOUIS, MISSOURI.

DRY GAS-METER WITH ROTATING DRUM.

SPECIFICATION forming part of Letters Patent No. 511,368, dated December 26, 1893.

Application filed February 23, 1893. Serial No. 463,333. (No model.)

*To all whom it may concern:*

Be it known that I, PAUL F. H. SOBOLEWSKI, a citizen of the United States, residing at St. Louis, in the State of Missouri, have invented a certain new and useful Improvement in Gas-Meters, of which the following is such a full, clear, and exact description as will enable any one skilled in the art to which it appertains to make and use the same, reference being had to the accompanying drawings, forming part of this specification.

The main objects of my invention are to provide a durable gas meter of simple construction and small cost, that will operate uniformly and measure the gas passing through it under all conditions with absolute accuracy.

Gas meters as heretofore constructed, have been of two varieties, viz: wet meters and dry meters. Both kinds have been found in practice to be unsatisfactory in their operation. The accuracy of the wet meter depends upon maintaining a body of water or other liquid therein at a constant level. The evaporation of this water or other liquid has the effect of causing the meter to fail to measure all the gas passing therethrough. The liability of the water or other liquid to freeze and thus render the meter inoperative, has also been found to detract largely from the efficiency of such meters.

The dry meter as heretofore constructed, consists substantially of a bellows of known capacity, and the gas has been measured by registering the number of the pulsations of said bellows. The flexible parts of the bellows used in the dry meter are made of leather, and it has been found in practice that these parts are soon rotted or corroded by the action of the gas. It has likewise been found that the leather of the bellows is caused to shrink by the moisture in the gas passing therethrough, thereby seriously affecting the accuracy of the measurement of the gas.

My device is designed to obviate the several defects which result from the construction and mode of operation of the gas meters now known and used, and I effect the desired end by providing a dry meter made entirely of metal or other material not likely to be rotted or corroded by the action of the gas, and not capable of being shrunk by the moisture therein. My newly invented gas meter consists of a hollow metallic casing having therein a cylindrical drum, divided into a series of separate compartments of determinate capacity, said compartments having a helical direction with respect to the axis of said drum. I provide also proper inlets for admitting the gas to said drum, and proper outlets for its escape therefrom. The quantity of gas flowing through said meter is indicated by a registering device actuated by the revolutions of said drum. I also preferably provide drip-reservoirs or chambers in the bottom of said casing for collecting the moisture or water which may be present in the gas, and proper means for drawing off the water collected in said reservoirs.

My invention can be best understood by referring to the accompanying drawings, in which—

Figure 1 is a front view of my gas meter showing the metallic casing thereof in section, and also having parts of the covering removed to show the manner of operating the registering device. Fig. 2 is a longitudinal section of the revolving drum employed in my meter, together with the stationary heads used in connection therewith. Fig. 3 is a view in cross-section of the metallic casing, showing one of the stationary heads with the aperture therein. Fig. 4 is a transverse section of the drum and casing taken on the line 4—4 of Figs. 1 and 2, looking in the direction of the arrows, showing the partitions and the circular drum-head with the several apertures therein. Fig. 5 is a sectional detail showing a device for maintaining a gas-tight connection between the drum and the fixed head-plates.

In the drawings (in which the same marks of reference indicate the same parts throughout the several views), A is a metallic casing, rectangular in cross-section. Said casing is provided at one end with an inlet nozzle B, and at the opposite end with an outlet nozzle C (Fig. 1). At the bottom of said casing are the drip-reservoirs or compartments D and E, said compartments being separated by the transverse partition F, the compartment D communicating with the inlet nozzle B through the orifice G, and the compartment E communicating with the outlet nozzle C through the orifice H. The compartment D has in the bottom thereof an opening closed by the plug S, and the compartment E has a similar opening closed by a similar plug S'.

At both ends of the metallic casing A are the rectangular head-plates I and J. The head-plate I fits accurately in said casing, and is normally in contact with the end of said casing A, but is adapted to be moved in and out by the adjusting-screws T (Figs. 1 and 5), which said adjusting-screws press upon a helical spring U which rests in depressions V (Fig. 3) in the fixed head-plate I. An end view of the head-plate I is shown in Fig. 3, and it is seen that said head-plate has in the lower part thereof, a sector-like opening W. The head-plate J within the opposite end of the casing A, is precisely similar in construction to the head-plate I, and has therein a sector-like opening W' (Figs. 1 and 2) corresponding to the opening W in the head-plate I. I may dispense with the adjusting-screws hereinbefore described as used in conjunction with the head-plate I.

Within the cylinder casing A is a hollow metallic cylindrical drum R, (Figs. 1 and 2.) Said drum is adapted to revolve upon an axis $b$, which said axis extends through the fixed head-plates I and J, and rests in gas-tight bearings $c$ and $d$ (Fig. 1). Extending from end to end of said drum is a series of six partitions, $e, f, g, h, a$ and $i$ (shown in Fig. 4). These partitions separate said drum into a series of six compartments, which compartments extend from end to end of said drum, and are sector-like in cross-section (see Fig. 4). The partitions extending from end to end of said drum have a helical direction with reference to the axis of the drum (shown in Fig. 2), so that said compartments do not extend through said drum in a true horizontal direction, but wind about the axis in a helical manner. On both ends of said drum, and rigidly secured thereto by means of soldering or other gas-tight connection, or if practicable, made integral therewith, are the circular revolving heads K (Figs. 2 and 4). The said heads K have therein a series of six sector-like openings, L, M, N, O, P and Q (Fig. 4), said openings each communicating with one of the compartments within the drum, and are similar in shape to the openings W and W' in the fixed head-plates I and J. The outer surfaces of the circular revolving head-plates K are made perfectly smooth so as to form a gas-tight joint with the fixed head-plates I and J.

The axis $b$ of the drum R at one end thereof, extends through the bearing $d$ of the casing A, and has rigidly affixed upon its outer end a bevel-wheel $j$ (Fig. 1), which said bevel-wheel gears into a second bevel-wheel $l$ affixed upon the lower end of the shaft $m$, which shaft is adapted to rotate in bearings $n$ and $o$ supported by brackets $p$ and $q$, said brackets being attached to the casing A. At the upper end of the shaft $m$ and rigidly affixed thereto, is a bevel-wheel $r$ which meshes in another bevel-wheel $s$, which said bevel-wheel $s$ actuates a registering device $t$ mounted upon the top of the casing A.

I make no claim with respect to the registering apparatus to be used in conjunction with my gas meter, but I contemplate that my meter may be used in conjunction with any ordinary registering device, and I have indicated such a device in Fig. 1 of the drawings, the registering device there shown being mounted upon the feet $x, y$ secured to the top of the casing A, and having a proper dial $w$ and a test indicator $u$. I preferably inclose the gearing devices by which the motion of the revolving drum is communicated to the registering mechanism, with a metallic casing $z$.

The operation of my gas meter may be briefly described as follows: The gas enters through the inlet nozzle B, and passing through the sector-like opening W of the fixed head-plate I, enters one of the compartments of the revolving drum R through one of the openings in the revolving drum-head K, which opening will register with the corresponding opening W of the fixed head-plate I. By reason of the helical direction of the compartments within the drum, when one end of a compartment registers with the inlet opening W of the fixed head-plate I, the other end of said compartment will be out of register with the outlet aperture W' in the fixed head-plate J, and will be closed by said head-plate J, and therefore the gas cannot pass from said compartment. The pressure of the gas within the compartment in register with the inlet aperture W, will, by reason of the helical construction of the same, cause the drum to revolve, and as it revolves the ends of other compartments will successively register with the inlet aperture W and permit gas to flow into said compartments. When the drum has so far revolved that any compartment into which gas has entered through the inlet aperture E registers at its opposite end with the outlet aperture W', the gas within said compartment will flow therefrom through the outlet aperture, and gas will thus be successively delivered from each compartment as it comes into register with the outlet opening in the fixed head-plate J, and will pass through the outlet nozzle C to the point of consumption. The number of revolutions of the drum will be indicated by the registering device hereinbefore described, and thus the quantity of gas passing therethrough will be determined. If there be moisture or water in the gas, it will flow through the orifices G and H as indicated by the partially feathered arrows leading through such orifices, and be collected in the reservoirs E and D, from whence it may be drawn off by removing the plugs S and S'.

I do not wish to be understood as limiting myself to the precise construction herein set out, as there are obvious modifications of the same which will suggest themselves to mechanics, and will not involve a departure from the spirit of my invention.

Having fully described my invention, what I desire to claim, and secure by Letters Patent of the United States, is—

1. In a meter for measuring gas, the combination of a casing having an inlet aperture and an outlet aperture, a drum adapted to rotate within said casing, said drum having separate compartments extending longitudinally therethrough, said compartments having a helical direction with reference to the axis of said drum, the apertures at the opposite ends of the several compartments of the drum being adapted respectively to register successively with the inlet aperture and with the outlet aperture of the casing and devices for communicating the motion of said drum to a registering device.

2. In a meter for measuring gas, the combination of a hollow casing having an inlet aperture and an outlet aperture, a drum adapted to rotate within said casing, said drum having a plurality of separate compartments extending longitudinally therethrough, said compartments having a helical direction with reference to the axis of said drum, and two heads having each an aperture therethrough, said heads being interposed between the casing and the ends of the drum, the apertures at the ends of the several compartments in the drum being adapted to register successively with the apertures in the heads.

3. In a gas meter, the combination of a hollow casing with inlet and outlet apertures, a drum adapted to rotate within said casing, said drum having a plurality of separate compartments extending longitudinally therethrough, circular heads rigidly affixed to each end of said drum, said heads having apertures corresponding with the ends of the several compartments in the drum, and fixed heads interposed between the casing and the circular heads on the ends of the drum, each of said fixed heads having a single aperture therethrough adapted to register successively with the several apertures in the circular drum-head.

4. In a meter for measuring gas, the combination of a hollow casing having an inlet aperture and an outlet aperture, a drum adapted to rotate within said casing, said drum having a plurality of separate compartments extending longitudinally therethrough, said compartments having a helical direction with reference to the axis of said drum, two heads having each an aperture therethrough, said heads being interposed between the casing and the two ends of the drum, the apertures at the ends of the several compartments in the drum being adapted to register successively with the apertures in the heads, and adjusting devices for moving one or both of said heads toward or against the end or ends of the drum.

5. In a gas meter, the combination of a horizontal drum adapted to revolve within a casing, and two drip-reservoirs in the bottom of said casing beneath the drum, the drip-reservoirs being suitably separated and communicating with the inlet and outlet apertures.

6. In a meter for measuring gas, the combination of a hollow casing having an inlet aperture and an outlet aperture, a drum adapted to rotate in said casing, said drum having a multiplicity of compartments extending from end to end therethrough in a helical direction with reference to the axis thereof, the openings at one end of said compartments being adapted to register successively with the inlet aperture and when so registering with said aperture the opening at the opposite end of said compartment to be out of register with the outlet aperture, and devices for communicating the motion of said drum to a registering device.

In testimony whereof I have hereunto set my hand and affixed my seal, this 18th day of February, 1893, in the presence of the two subscribing witnesses.

PAUL F. H. SOBOLEWSKI. [L. S.]

Witnesses:
WALTER D. COLES,
A. C. FOWLER.